United States Patent [19]

DiGiulio et al.

[11] 4,097,551
[45] Jun. 27, 1978

[54] RUBBER MODIFIED DICARBOXYLIC ACID COPOLYMER BLENDS

[75] Inventors: Adolph V. DiGiulio; Jack N. Bauer, both of Pittsburgh, Pa.

[73] Assignee: Arco Polymers, Inc., Philadelphia, Pa.

[21] Appl. No.: 752,239

[22] Filed: Dec. 20, 1976

[51] Int. Cl.² ........................................... C08L 53/02
[52] U.S. Cl. .............................................. 260/876 B
[58] Field of Search ................................... 260/876 B

[56] References Cited

U.S. PATENT DOCUMENTS

| | | | |
|---|---|---|---|
| 3,637,554 | 1/1972 | Childers | 260/876 B |
| 3,873,645 | 3/1975 | Muirhead et al. | 260/876 B |
| 3,919,354 | 11/1975 | Moore et al. | 260/880 R |
| 4,017,436 | 4/1977 | Tabana et al. | 260/876 B X |

FOREIGN PATENT DOCUMENTS 1,077,769  8/1967  United Kingdom.

OTHER PUBLICATIONS

Shell Printing Limited, Technical Bulletin, Mar. 1972; Cariflex Tr-1101 as a Secondary Reinforcing Agent in Toughened Polystyrenes.

*Primary Examiner*—Howard E. Schain
*Attorney, Agent, or Firm*—Lewis J. Young

[57] ABSTRACT

A rubber-modified copolymer blend having enhanced toughness is prepared from a block copolymer rubber and a rubber-modified non-equimolar copolymer of ethylenically unsaturated dicarboxylic acids, or their derivatives, with one or more copolymerizable monomers.

8 Claims, No Drawings

RUBBER MODIFIED DICARBOXYLIC ACID COPOLYMER BLENDS

BACKGROUND OF THE DISCLOSURE

The improvement of the resistance to impact of thermoplastic molding compositions by the addition of rubber has long been known. The rubbers have been added by blending and by graft copolymerization. The increase in impact property is usually accompanied by a decrease in thermal properties. Attempts to alleviate the thermal property loss have been made by incorporating anhydride containing monomers into the polymer. Thus, styrene-maleic anhydride copolymers have higher heat distortion temperatures than polystyrene. Rubber-modified styrene-maleic anhydride copolymers have been made which do have increased impact strength and heat distortion temperatures. A process for modifying a styrene-maleic anhydride copolymer with diene rubber by polymerizing the monomers in the presence of the rubber is described in U.S. Pat. No. 3,919,354. Blends of such rubber-modified anhydride copolymers with polycarbonate resins are described in U.S. Pat. No. 3,966,842.

BRIEF SUMMARY OF THE INVENTION

It has now been found that blends of rubber-modified copolymers of ethylenically unsaturated dicarboxylic acid moieties and one or more monomers copolymerizable therewith and block copolymer rubbers have greater impact strength and toughness than compositions with equivalent rubber contents wherein all of the rubber is blended with un-modified dicarboxylic acid moiety copolymers.

DETAILED DESCRIPTION OF THE INVENTION

The compositions of the present invention consist essentially of a blend of (a) 85–95% by weight of rubber-modified, non-equimolar copolymers of ethylenically unsaturated dicarboxylic acids or their derivatives, with one or more copolymerizable monomers and (b) 5–15% by weight of a diene block copolymer rubber.

(a) The Rubber-modified, non-equimolar copolymers

Non-equimolar copolymers are comprised of a minor amount, that is less than 50 mole percent, of an ethylenically unsaturated dicarboxylic acid moiety and a major amount, that is greater than about 50 mole percent, of one or more monomers copolymerizable therewith.

The acid moiety may be an ethylenically unsaturated dicarboxylic acid, its anhydride, its imide or substituted imides or a half acid derivative of such a dicarboxylic acid or mixtures thereof. Suitable acids and their derivatives useful in the present invention are maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid and phenylmaleic acid, the anhydrides of these acids, the imides of these acids and their N-substituted derivatives, the acid amide derivatives, or the half esters of these with suitable alcohols. The alcohols used may be the primary and secondary alkanols containing up to 6 carbon atoms, such as, methyl alcohol, ethyl alcohol, n-propyl alcohol, n-butyl alcohol, secbutyl alcohol, and n-pentyl alcohol; halogenated alkanols having up to 6 carbon atoms, such as 2,3-dichloro-1-propanol, and 2-bromo-1-propanol; arylalkyl alcohols, such as benzyl alcohol; cyclic alcohols having up to 6 carbon atoms, such as cyclopentanol, cyclohexanol and tetrahydrofurfuryl alcohol; ether alcohols, such as 2-butoxyethanol and the ethyl ether of diethylene glycol, and the like.

The imide derivatives may be prepared by reacting the starting anhydride or diacid copolymers with aqueous ammonia or amines. Suitable amines are the alkyl amines having 1 to 4 carbon atoms, such as methylamine, ethylamine, propylamine, isopropylamine and butylamine; ethanolamine; aniline, benzylamine; allylamine and the like. Also suitable are the water soluble α,ω-alkylenediamines having 2 to 6 carbon atoms in the alkylene group, such as ethylenediamine, and hexamethylenediamine. Arylene diamines, such as the phenylene diamines and benzidines may also be used. The diamines are useful for preparing copolymers having varying degrees of crosslinking. These diamines may be used alone or in combination with other monoamines to vary the degree of crosslinking.

The copolymerizable monomers may be vinyl aryl monomers, such as styrene, alpha-methylstyrene, nuclear methylstyrenes, ethylstyrene, isopropylstyrene, tertbutylstyrene, chlorostyrenes, dichlorostyrenes, vinyl naphthalene and the like; unsaturated nitriles, such as acrylonitrile and methacrylonitrile; and acrylic monomers, such as acrylic acid, methacrylic acid, methyl acrylate and methyl methacrylate. Mixtures of two or more of these copolymerizable monomers may be used if desired.

Non-equimolar starting copolymers may be prepared by any of the several methods available for the preparation of non-equimolar copolymers. Thus, these copolymers may be prepared by solution polymerization directly from the respective monomers by the incremental addition of the reactive monomer as taught by U.S. Pat. No. 2,971,939; by a continuous recycle polymerization process such as described in U.S. Pat. Nos. 2,769,804 and 2,989,517; or by the suspension polymerization process described in U.S. Pat. No. 3,509,110.

The rubber-modified, non-equimolar copolymers useful in the present invention may be made by dissolving the rubber in the monomer or monomer mixture prior to polymerization by the methods of the above patents. Such a preparation of rubber-modified styrene-maleic anhydride copolymer is described in U.S. Pat. No. 3,919,354, wherein a rubber is dissolved in styrene, polymerization initiated, and maleic anhydride added continuously to the polymerizing mixture at a rate sufficient to maintain the concentration of anhydride low.

The rubber will normally be used in amounts of from 5 to 40 percent by weight based on the total rubber-modified, non-equimolar copolymer.

Suitable rubbers, or elastomers are the diene rubbers which contain at least 50% by weight of a conjugated 1,3-diene. These include conjugated 1,3-diene rubbers, styrene-diene copolymer rubbers, acrylonitrile-diene copolymer rubbers, ethylene-propylene-diene terpolymer rubbers, acrylate-diene copolymer rubbers, and mixtures thereof. Preferred rubbers are diene rubbers such as homopolymers of conjugated dienes such as butadiene, isoprene, chloroprene, and piperylene and copolymers of such dienes with up to 50 mole percent of one or more copolymerizable mono-ethylenically unsaturated monomers, such as styrene, substituted styrenes, acrylonitrile, methacrylonitrile and isobutylene. Also suitable, are the graded block copolymer rubbers and A-B block copolymer rubbers containing 70 to 95 percent by weight of butadiene and 5 to 30 percent by weight of styrene.

(b) Diene block copolymer rubbers

The diene block copolymer rubbers suitable for the present invention are block copolymers of vinyl aromatic compounds and conjugated dienes wherein the blocks of conjugated dienes will have average molecular weights greater than the molecular weight of the combined blocks of vinyl aromatic compounds.

These block copolymers will generally be 2 to 50 percent by weight vinyl aromatic compound and 50 to 98 percent by weight conjugated diene. More preferably, the vinyl content will be 10 to 40 percent with the diene content of 60 to 90 percent. The vinyl aromatic compounds may be styrene, alpha methylstyrene, nuclear methylstyrenes, ethylstyrene, isopropylstyrene tert-butylstyrene, chlorostyrenes, dichlorostyrenes and vinyl naphthalene and the like. The preferred compound is styrene.

The conjugated diene may be butadiene, isoprene, chloroprene, and piperylene. The preferred dienes are butadiene and isoprene.

Suitable block copolymer rubbers are the graded block, A-B diblock, the radial or star block, A-B-A triblock, and the A-B-A hydrogenated triblock rubbers.

All of the block copolymer rubbers can be made by known processes involving anionic initiators such as butyl lithium.

Graded diblock rubbers are those A-B type block copolymers in which each A block is essentially polymerized vinyl aromatic monomer with a minor amount of a conjugated diene, and each B block is essentially a conjugated diene polymer with a minor amount of vinyl aromatic monomer. Such graded block rubbers may be prepared by polymerizing a mixture of the vinyl aromatic monomer and the diene in a neutral solvent, such as n-hexane, using a sec-butyl lithium catalyst. In this type of system, the initial polymer chains are predominently polydiene, but as the diene is depleted the later polymer formed is predominantly polyvinyl aromatic monomer. Such copolymer rubbers are also available commercially, as for instance Stereon 720, a Firestone Synthetic Rubber & Latex Co. product having 90 percent by weight butadiene and 10 percent by weight styrene with 55 percent by weight of the styrene appearing as polystyrene blocks.

Diblock copolymer rubbers are copolymers of A-B type wherein A represents a block of poly(vinyl aromatic monomer) and B represents a block of poly(conjugated diene). True diblock copolymer rubbers are made by polymerizing one of the monomers to essential completion and then adding the second monomer. Thus butadiene may be anionically polymerized using sec-butyl lithium catalyst. Then, prior to termination of the polymer chains, the styrene is added and polymerization allowed to continue. Diblock copolymers may also be prepared by separately polymerizing each monomer in the presence of a lithium catalyst and then combining the separate blocks by reacting the lithium terminated blocks together in the presence of a difunctional coupling agent. Such diblock rubbers are also available commercially, as for instance Solprene 1205, a Phillips Petroleum Company product having 75 percent by weight polybutadiene and 25 percent by weight polystyrene.

Radial or star block copolymer rubbers are branched copolymers having at least three A-B diblock chains connected to a central nucleus. Thus, chains of block copolymers prepared by polymerizing vinyl aromatic monomers and conjugated diene monomers in inert solvents using organo-lithium catalysts can be added, while still lithium terminated, to compounds having at least three functional sites capable of reacting with the lithium to carbon bond and adding to the carbon possessing this bond in the copolymer. Such polyfunctional compounds are, for example, polyepoxides, polyisocyanates, polyimines, polyaldehydes, polyketones, polyanhydrides, polyesters, etc. Such radial block rubbers are also available commercially, as for instance Solprene 406 and Solprene 414 products of Phillips Petroleum Co. having 60 percent by weight polybutadiene and 40 percent by weight polystyrene.

Triblock copolymer rubbers are linear copolymers of the A-B-A or B-A-B type, wherein, again, A represents a block of poly(vinyl aromatic monomer) and B represents a block of poly(conjugated diene). Such triblock copolymers can be prepared by sequential addition of the desired monomers into a lithium alkyl initiated polymerization. Another effective method would be to polymerize the diene monomer, for example, in the presence of a difunctional catalyst, such as dilithiostilbene, and then adding the vinyl aryl monomer to form the end blocks. Such triblock copolymer rubbers are also available commercially as, for example, Kraton 1101, a product of Shell Chemical Co. being a polystyrene-polybutadiene-polystyrene triblock rubber having 70 percent by weight polybutadiene and 30 percent by weight polystyrene.

Also suitable are the hydrogenated triblock copolymer rubbers formed by, for example, selective hydrogenation of A-B-A triblock type copolymers. Especially suitable are the hydrogenated triblock copolymer rubbers wherein the hydrogenation has been primarily in the polydiene blocks, B. Thus U.S. Pat. No. 3,595,942 describes the polymers and suitable methods for their hydrogenation such that at least 80% of the aliphatic unsaturation has been reduced by hydrogenation and less than 25% of the aromatic unsaturation of the vinyl aromatic monomer blocks, A, have been hydrogenated. Such copolymers are available commercially as, for example, Kraton G, a product of Shell Chemical Co., being a polystyrene-polyisoprene-polystyrene triblock rubber wherein the polyisoprene portion has been hydrogenated to a poly(ethylene/propylene) copolymer block.

The blends of this invention can be prepared by any known means which will provide an essentially homogeneous mixture of the polymers and block rubbers. Compounding rolls, mixing extruders, Banbury mixers, plastographs, high intensity mixers, etc. are all suitable for preparing the blends at temperatures suitable to heat plastify the ingredients.

The following examples are given to further illustrate the invention, but are not intended to be all inclusive. All percentages are weight percent unless otherwise indicated.

EXAMPLE I

The following blends were made by passing the respective mixtures twice through a one-inch mixing extruder:

(1) A copolymer of 92% styrene and 8% maleic anhydride.

(2) A mixture of 85% of the copolymer of mixture (1) and 15% of Kraton 1101, a styrene-butadiene-styrene linear triblock copolymer rubber having 70% butadiene and 30% styrene in the rubber.

(3) A rubber-modified styrene-maleic anhydride copolymer having 82.8% styrene, 7.2 maleic anhydride and 10% rubber. The copolymer was made by polymerizing the monomers in the presence of Stereon 720, a graded block copolymer rubber (90% butadiene-10% styrene), by a process capable of preparing a uniform, non-equimolar copolymer of styrene-maleic anhydride.

(4) A mixture of 95% of the copolymer of mixture (3) and 5% of Kraton 1101, a styrene-butadiene-styrene linear triblock copolymer rubber having 70% butadiene and 30% styrene in the rubber.

(5) A mixture of 95% of the copolymer of mixture (3) and 5% of Stereon 720, a graded block copolymer rubber (90% butadiene-10% styrene).

(6) A mixture of 95% of the copolymer of mixture (3) and 5% of Solprene 406, a radial block copolymer rubber having 60% butadiene and 40% styrene.

(7) A mixture of 95% of the copolymer of mixture (3) and 5% of Solprene 414, a star block copolymer rubber having 60% butadiene and 40% styrene.

The resulting blends were injection molded at 216° C., and tested by standard test methods. The elongation at break was measured by ASTM-D638; the Izod notched impact by ASTM-D256; the Vicat heat distortion temperature by ASTM-D1525; and the deflection temperature under load (DTUL) on ½ inch bars annealed at 90° C. using 264 psi load by ASTM-D648. Bar blends were simply the number of bends a test specimen underwent before breaking. The Gardner impact test was performed on a Gardner Variable Impact Tester manufactured by Gardner Laboratory, Inc., Bethesda, Maryland. The impact, in inch-pounds, is measured on standard injection molded dumbbell shaped specimens. Because of the variation in stresses inherent in the specimens, the impact is measured on both ends, that is the gate end and the dead (furthest from the gate) end. The results are tabulated in Table I.

rable thermal properties as compared to blends 2 and 3. All blends were superior to a degree to the unmodified copolymer of Blend 1 which was shown as a control. The copolymer of Blend 3 has 10% rubber pre-added with the styrene-maleic anhydride and is the base copolymer used to prepare the 14.5% total rubber blends 4-7.

EXAMPLE II

To illustrate the enhanced toughness contributed by blending greater amounts of block copolymer rubbers into rubber-modified styrene-maleic anhydride copolymers the following blends were made as in Example I:

(8) A rubber-modified styrene-maleic anhydride copolymer having 78.2% styrene, 6.8% maleic anhydride and 15% rubber. This copolymer was made by polymerizing the monomers in the presence of Stereon 720, a graded block copolymer rubber having 90% butadiene and 10% styrene, by a process capable of preparing a uniform, non-equimolar copolymer of styrene-maleic anhydride.

(9) A mixture of 90% of the rubber-modified copolymer of blend (3), Example I, with 10% of Stereon 720, a graded block copolymer rubber (90% butadiene-10% styrene).

(10) A mixture of 90% of the rubber-modified copolymer of blend (3), Example I, with 10% of Kraton 1101, a styrene-butadiene-styrene linear triblock copolymer rubber having 70% butadiene and 30% styrene.

(11) A mixture of 90% of the rubber-modified copolymer of blend (3), Example I, with 10% of Solprene 406, a radial block copolymer rubber having 60% butadiene and 40% styrene.

(12) A mixture of 90% of the rubber-modified copolymer of blend (3), Example I, and 10% of Solprene 414, a star block copolymer rubber having 60% butadiene and 40% styrene.

(13) A mixture of 95% of the rubber-modified copolymer of blend (8) and 5% of Solprene 406, a radial block copolymer rubber having 60% butadiene and

TABLE I

| Blend No. | 1 | 2 | 3 | 4 | 5 | 6 | 7 |
|---|---|---|---|---|---|---|---|
| Total Rubber, % | 0 | 15 | 10 | 14.5 | 14.5 | 14.5 | 14.5 |
| Elongation at Break, % | 2.0 | 20.8 | 19.4 | 27.7 | 28.1 | 34.2 | 37.5 |
| Izod Impact, ft-lb/in. notch | 0.28 | 0.74 | 1.4 | 1.7 | 1.6 | 2.1 | 1.3 |
| Bar Bends, no. | 0 | 2 | 8 | 14 | 18 | 21 | 13 |
| Vicat, ° C. | 120 | 117 | 118 | 118 | 118 | 119 | 117 |
| DTUL, ° C. | 113 | 113 | 113 | 113 | 113 | 111 | 113 |
| Gardner Impact, in-lb. | | | | | | | |
| gate end | 0 | 8 | 5 | 10 | 7 | 11 | 12 |
| dead end | 0 | 6 | 7 | 21 | 12 | 23 | 22 |

Only blends 4 through 7 are contemplated within the scope of the present invention. These blends all have 14.5% total rubber with 9.5% being pre-added into the styrene-maleic anhydride copolymer and 5% being added block copolymer rubbers. Blend 2 shows that blending 15% of block rubber into a styrene-maleic anhydride copolymer does not greatly enhance the toughness as measured by the number of bar bends, the notched Izod and the Gardner impact values. Blends 4-7 have greater percent elongation at break, greater Gardner impact, greater flexibility (more bar bends) and greater or equal Izod impacts while maintaining compa- 40% styrene.

(14) A mixture of 95% of the rubber-modified copolymer of blend (8) and 5% of Solprene 414, a star block copolymer rubber having 60% butadiene and 40% styrene.

(15) A mixture of 90% of the rubber-modified copolymer of blend (8) and 10% of Solprene 406.

(16) A mixture of 90% of the rubber-modified copolymer of blend (8) and 10% of Solprene 414.

The blends were injection molded and tested as in Example I and the results are given in Table II.

TABLE II

| Blend No. | 1 | 9 | 10 | 11 | 12 | 13 | 14 | 15 | 16 |
|---|---|---|---|---|---|---|---|---|---|
| Total Rubber, % | 0 | 19 | 19 | 19 | 19 | 19.25 | 19.25 | 23.5 | 23.5 |
| Elongation at Break, % | 2.0 | 33.5 | 42 | 47.6 | 54.4 | 42.6 | 54.6 | 61.7 | 48.2 |

TABLE II-continued

| Blend No. | 1 | 9 | 10 | 11 | 12 | 13 | 14 | 15 | 16 |
|---|---|---|---|---|---|---|---|---|---|
| Izod Impact, ft-lb/in notch | 0.28 | 1.6 | 2.5 | 2.9 | 2.0 | 2.0 | 1.6 | 2.6 | 2.1 |
| Bar Bends, No. | 0 | 12 | 28 | 32 | 28 | 20 | 22 | 45 | 46 |
| Vicat, °C | 120 | 119 | 117 | 117 | 117 | 116 | 116 | 116 | 114 |
| DTUL, °C | 113 | 113 | 113 | 112 | 113 | 112 | 112 | 112 | 111 |
| Gardner Impact, in-lb. | | | | | | | | | |
| gate end | 0 | 5 | 66 | 101 | 100 | 71 | 41 | 120 | 88 |
| dead end | 0 | 12 | 96 | 120 | 106 | 70 | 80 | 120 | 104 |

It can be seen that the blends again have greatly enhanced toughness and flexibility.

Substitution of rubber modified imide copolymers for the anhydrides of Blends (3) of Example I and (8) of Example II in the blends with 5 and 10% of the above block copolymer rubbers gave values of enhanced toughness and flexibility of the same order of magnitude.

EXAMPLE III

To illustrate the necessity to use the block copolymer rubbers for the blends and not ordinary diene rubbers the following blends were made:

(17) A mixture of 90% of the copolymer of mixture (3) Example I, and 10% of Diene 35, a polybutadiene rubber made by solution polymerization with an alkyl lithium catalyst by Firestone Synthetic Rubber & Latex Co. and having about 35% cis-1,4-configuration and 9.1% 1,2-vinyl structure.

(18) A mixture of 90% of the copolymer of mixture (3), Example I, and 10% of Taktene 1202, a high cis-1,4-polybutadiene (98%-cis) produced by the Ziegler/Natta catalyst process by Polysar Inc.

The blends were injection molded at 210° C., and tested as in Example I. The results, along with those for the base copolymer mixture (3) are shown in Table III

TABLE III

| Blend No. | 3 | 17 | 18 |
|---|---|---|---|
| Total Rubber, % | 10 | 19 | 19 |
| Elongation at Break, % | 19.4 | 19.6 | 5.9 |
| Izod Impact, ft-lb/in. notch | 1.4 | 1.1 | 0.9 |
| Bar Bends, no. | 8 | 4 | 1 |
| Vicat, °C. | 118 | 116 | 118 |
| DTUL, °C. | 113 | | |
| Gardner Impact, in-lb. | | | |
| gate end | 5 | 1.5 | 1.5 |
| dead end | 7 | 3.5 | 3.5 |

The blends of rubber-modified styrene-maleic anhydride copolymer with the two polybutadienes show no improvement over the starting modified copolymer properties. In fact, the product made with Taktene 1202, blend no. 18, was considerably poorer in percent elongation. The blend 17, is also considerably poorer considering that it has 19% total rubber compared to only 10% rubber in the starting copolymer.

We claim:

1. A thermoplastic molding composition consisting essentially of a blend of
   a. 5-15% by weight, based on total molding composition, of a block copolymer of
      A. 2-50% by weight, based on block copolymer, of monovinyl aromatic monomer and
      B. 50-98% by weight, based on block copolymer, of a conjugated diene monomer, and
   b. 85-95% by weight, based on total molding composition, of a copolymer made by polymerizing
      A. 60-95% by weight, based on copolymer (b), of a mixture of
         (1) 4-35% by weight of an ethylenically unsaturated dicarboxylic acid moiety and
         (2) 65-96% by weight of one or more monomers copolymerizable therewith selected from the group consisting of monovinyl aryl monomers, unsaturated nitriles, and acrylic monomers, in the presence of
      B. 5-40% by weight, based on copolymer (b), of a diene rubber;
   whereby the sum of the block copolymer (a) and the diene rubber (bB) is 9-50% by weight of the total molding composition.

2. A thermoplastic molding composition consisting essentially of a blend of
   a. 5-15% by weight, based on total molding composition, of a block copolymer of
      A. 2-50% by weight, based on block copolymer, of monovinyl aromatic monomer and
      B. 50-98% by weight, based on block copolymer, of a conjugated diene monomer, and
   b. 85-95% by weight, based on total molding composition, of a copolymer made by polymerizing
      A. 60-95% by weight, based on copolymer (b), of a mixture of
         (1) 4-35% by weight of an ethylenically unsaturated dicarboxylic acid moiety and
         (2) 65-96% by weight of a monovinyl aromatic monomer
      in the presence of
      B. 5-40% by weight, based on copolymer (b), of a diene rubber;
   whereby the sum of the block copolymer (a) and the diene rubber (bB) is 9-50% by weight of the total molding composition.

3. A thermoplastic molding composition consisting essentially of a blend of
   a. 5-15% by weight, based on total molding composition, of a block copolymer of
      A. 2-50% by weight, based on block copolymer, of styrene and
      B. 50-98% by weight, based on block copolymer, of butadiene, and
   b. 85-95% by weight, based on total molding composition, of a copolymer made by polymerizing
      A. 60-95% by weight, based on copolymer (b), of a mixture of
         (1) 4-35% by weight of maleic anhydride and
         (2) 65-96% by weight of stryene in the presence of
      B. 5-40% by weight, based on copolymer (b), of a diene rubber;
   whereby the sum of the block copolymer (a) and the diene rubber (bB) is 9-50% by weight of the total molding composition.

4. A method for preparing thermoplastic molding compositions having greater toughness and flexibility comprising the steps of a. forming a rubber-modified, non-equimolar copolymer by polymerizing
1. 60-95% by weight, based on rubber-modified copolymer, of a mixture of an ethylenically unsaturated dicarboxylic acid moiety and one or more monomers copolymerizable therewith in the presence of
2. 5-40% by weight, based on rubber-modified copolymer, of a diene rubber; said mixture (a1) having
A. 4-35% by weight, based on total mixture, of ethylenically unsaturated dicarboxylic acid moiety and
B. 65-96% by weight, based on total mixture, of the copolymerizable monomers;
said copolymerizable monomers being selected from the group consisting of monovinyl aromatic monomers, unsaturated nitriles, acrylic monomers, and mixtures thereof; and
b. blending into said rubber-modified copolymer 5-15% by weight, based on total blend, of a block copolymer rubber having
1. 2-50% by weight, based on block copolymer, of monovinyl aromatic monomer and
2. 50-98% by weight, based on block copolymer, of a conjugated diene monomer.

5. A method for preparing thermoplastic molding compositions having greater toughness and flexibility comprising the steps of
a. forming a rubber-modified, non-equimolar copolymer by polymerizing
1. 60-95% by weight, based on rubber-modified copolymer, of a mixture of an ethylenically unsaturated dicarboxylic acid moiety and a monovinyl aromatic monomer in the presence of
2. 5-40% by weight, based on rubber-modified copolymer, of a diene rubber; said mixture (a1) having
A. 4-35% by weight, based on total mixture, of ethylenically unsaturated dicarboxylic acid moiety and
B. 65-96% by weight, based on total mixture, of monovinyl aromatic monomer; and
b. blending into said rubber-modified copolymer 5-15% by weight, based on total blend, of a block copolymer rubber having
1. 2-50% by weight, based on block copolymer, of monovinyl aromatic monomer and
2. 50-98% by weight, based on block copolymer, of a conjugated diene monomer.

6. The composition of claim 1 wherein the block copolymer is selected from the group consisting of A-B diblock, A-B graded diblock, A-B star or radial block, A-B-A triblock, and A-B-A hydrogenated triblock copolymer rubbers wherein A represents a monovinyl aromatic monomer block, B represents a conjugated diene monomer block, and the B blocks represent 50-98% by weight of the total block copolymer.

7. The composition of claim 1 wherein the diene rubber (bB) contains at least 50% by weight of a conjugated 1,3-diene and is selected from the group consisting of conjugated 1,3-diene rubbers, styrene-diene copolymer rubber, acrylonitrile-diene copolymer rubbers, ethylene-propylene-diene terpolymer rubbers, acrylatediene copolymer rubbers, and block copolymer rubbers.

8. The composition of claim 1 wherein the ethylenically unsaturated dicarboxylic acid moiety is selected from the group consisting of an ethylenically unsaturated dicarboxylic acid, an ethylenically unsaturated dicarboxylic acid anhydride, an ethylenically unsaturated dicarboxylic acid imide, an N-substituted ethylenically unsaturated dicarboxylic acid imide, an ethylenically unsaturated dicarboxylic acid half ester, and mixtures thereof.

* * * * *